3,317,628
POLYMERIZATION OF OLEFINS USING AMMONIATED COBALT SALT IMPREGNATED CARBON CATALYST
James M. Schuck, Webster Groves, and Robert G. Schultz, Vinita Park, Mo., assignors to Monsanto Company, St. Louis, Mo., a corporation of Delaware
No Drawing. Filed July 12, 1963, Ser. No. 294,750
11 Claims. (Cl. 260—683.15)

This application is a continuation-in-part of copending application Ser. No. 229,192, filed Oct. 8, 1962, now abandoned.

This invention relates to the polymerization of olefins to normally liquid products. More particularly, this invention relates to an improved process for preparing substantially straight chained liquid olefin products by dimerizing olefins, and to a catalyst to be used in that process.

Presently known processes for polymerizing gaseous alpha-olefins involve contacting the alpha-olefin, e.g., ethylene and propylene, with cobalt on carbon catalyst prepared by heating a cobalt salt impregnated carbon in a reducing atmosphere, particularly in the presence of hydrogen to reduce substantially all of the cobalt derived from the cobalt salt to the metallic state. Another prior process for polymerizing propylene requires that nitric acid be used to wash the carbon prior to its being impregnated with the cobalt salt in preparing the catalyst.

By such prior art processes it was desired to produce either solid polymer products, oily products to be used as lubricating oils, or highly branched liquid gasoline fuels. However, we have discovered that the use of catalyst compositions and polymerization processes of the above general types do not produce the desired type of liquid products which are suitable as intermediates in the preparation of biodegradable detergents. For purposes of preparing biodegradable detergents, it is thought suitable that the liquid olefins, used in preparing the detergent chemicals, e.g., to alkylate arene compounds such as phenol, toluene, and benzene, etc. which are then sulfonated according to conventional techniques, have as straight a carbon to carbon chain as is economically and technologically obtainable. The total carbon content in the olefin to be used to alkylate the arene compound is desirable between about 10 to 16 carbon atoms.

One route to obtain such substantially straight chain olefins having from 10 to 20 carbon atoms is to dimerize or trimerize lower olefins ($C_4$ to $C_{10}$) which are themselves substantially straight chained. Examples of such olefins which could be used are the butenes, pentenes, hexenes, heptenes, octenes, nonenes, and decenes. It follows that the straighter these lower olefins are the better are the chances of obtaining larger yields of straight chained higher olefins. It is preferred also, but not required, that the lower olefin to be used in the dimerizing process have the olefin double bond in a terminal position, i.e., in an alpha- or 1-position. Dimerization of nonenes and decenes to octadecenes or to eicosenes is somewhat slower than the dimerization of the gaseous or liquid lower olefins.

By the use of various catalytic materials $C_4$ to $C_{10}$ carbon olefin mixtures of various isomeric structures have been obtained. Various percentages of these $C_4$-$C_{10}$ olefin mixtures are olefin compounds which are suitable for use in making biodegradable detergent products. It is then necessary to separate the desirable isomers from those which are not wanted. This is usually done by distillation, and other techniques known in the art. However, in such processes some undesired isomers are not readily removed from the desired products by conventional techniques because of similar physical or chemical properties such as similar boiling points. For example, 2-methylpentene-2 is an especially undesired isomer in hexene fractions for the purposes of this invention because it is not separated from n-hexenes by commercial methods of distillation and therefore special procedures must be adopted to separate it from the n-hexenes or it must remain as an impurity.

It is desirable therefore, to find methods for preparing liquid olefin products having high percentages of the desired straight chained isomers while eliminating or keeping at a low level the production of undesired branched isomers in the liquid olefin product so that the above referred to separation steps can be minimized or eliminated altogether.

By this invention there is provided a polymerization process and a catalyst composition for dimerizing olefins to liquid olefins, a major proportion of which are especially suited for use in the production of biodegradable detergent chemicals. We have found that if activated carbon, used in the making of cobalt oxide on carbon catalysts (abbreviated CoO/C), is first contacted or treated with an ammoniating agent before the cobalt salt is impregnated or applied to the carbon, and then the catalyst composition so obtained is activated by heating in an inert atmosphere, either an inert gas or a vacuum and used to polymerize olefins, the life of the catalyst is extended, the yield of product in terms of weight of liquid product per unit weight of catalyst is increased very substantially, and the formation of difficultly removable isomers is minimized if not eliminated. We have also found that if the cobalt salt impregnated carbon is ammoniated or treated with an ammoniating agent as above, i.e., after the cobalt salt is put on the carbon, the yield is still better. In our best embodiment of the invention, we contemplate using both the ammoniation treatment of the carbon before the cobalt salt is applied, and the ammoniation of the cobalt salt impregnated carbon, although two ammoniations are not essential for some advantageous effect over untreated CoO/C catalysts. For simple dimerization polymerization of substantially pure alpha-olefins we have discovered that lower catalyst activation temperatures, not above 300° C. are desirable. For polymerizing olefins, a substantial portion of which are internal olefins, we have discovered that a CoO/C catalyst activated at temperatures of about 450°–550° C. is best since such catalyst causes substantial isomerization to alpha-olefins which then dimerize to straight chained olefins of the desired carbon atom content.

Thus, one aspect of this invention provides a method for improving the conversion of gaseous olefins to low-boiling liquid polymers, a substantial portion of which is a dimer product while minimizing or completely eliminating the formation of undesired isomeric products. This is accomplished according to this invention, by polymerizing the gaseous mono-olefin with a CoO/carbon catalyst which has been prepared by impregnating a carbon substrate or carrier, pretreated with an ammoniating agent with a cobalt salt of an oxygen containing acid, decomposing the cobalt salt on the carbon by heating in an inert gas, preferably re-treating the CoO/carbon catalyst with an ammoniating agent and activating the CoO/carbon in an inert gas at a temperature of from 200° to about 550° C., preferably not above about 300° C.

Another aspect of this invention provides a method for polymerizing olefins in a manner which changes the distribution in the liquid dimer fraction so as to obtain high yields of substantially linear isomers while eliminating or at least substantially reducing the production of difficultly removable branched isomers.

Yet another aspect of this invention provides a method for preparing new catalyst compositions which are particularly useful for dimerizing gaseous alphaolefins to substantially straight chained low-boiling liquid olefins.

Another aspect of this invention provides a two step olefin dimerization process for making olefins suitable for use in making biodegradable detergents by polymerizing a gaseous alpha-olefin to a low boiling liquid olefin using an ammoniated carbon based CoO/C catalyst, activated by heating to at least 200° C. but not above about 300° C. in an inert atmosphere, and then dimerizing the low-boiling liquid olefin product with carbon based CoO/carbon catalyst, activated by heating to from 300° to 550° C.

In this specification and in the claims the term "olefin which is being polymerized" means an olefin having from 2 to about 10 carbon atoms. The term "alpha-olefin" means an olefin as defined above having the double bond thereof between the 1- and 2-carbon atoms of the molecule, i.e., in a terminal position. The term "gaseous alpha-olefin" means an alpha-olefin as defined above which is a gas at standard temperature, pressure, and volume, and generally are those having from 2 to 4 carbon atoms, e.g., ethylene, propylene, and 1-butene, either in the gaseous state, liquid state, or dissolved in a suitable liquid diluent such as benzene, toluene, cyclohexane, decahydronaphthalene, hexane, heptane, etc. or as a compressed liquid, either alone or diluted with liquid alkanes.

The term "drying" in reference to catalyst preparation means removing substantially all of the visible liquid therefrom, i.e., until the treated carbon is visibly dry.

The term "ammoniate" and the objective and participle variations of such term such as "ammoniated," "ammoniating agent" etc., in reference to the carbon treatment and catalyst preparation includes the treatment of the carbon used to make the catalyst as well as the treatment of the cobalt salt-impregnated carbon and encompasses the use of ammonia gas, liquid ammonia under pressure, aqueous ammonium hydroxide or these materials mixed with inert diluents at subatmospheric, atmospheric, and superatmospheric pressure at temperatures ranging from about −50° C. to about 300° C.

For preparing the low-boiling liquid polymers according to the polymerization process of this invention it is essential that the catalyst used in such process be prepared by impregnating an ammoniated activated carbon with a solution of a cobalt salt, preferably an aqueous solution of an oxygen containing acid, examples of said salts being cobalt acetate, cobalt sulfate, and more preferably cobalt nitrate, in the cobaltous form. Other cobalt salts which may be used but which are less preferred, are the cobalt salts of the alkanoic acids having say 1 to 6 carbon atoms, such as cobalt formate, cobalt propionate, cobalt butanoate, pentanoate, cobalt hexanoate, as well as cobalt ammonium sulfate, cobalt arsenate, cobalt arsenite, cobalt chromate, cobalt vanadate, cobalt molybdate, cobalt iodate, cobalt oxalate, cobalt citrate, cobalt sulfite, etc. After impregnation of the treated carbon, the cobalt salt-impregnated ammoniated carbon, thus obtained, is dried, then optionally, but preferably, treated again with an ammoniating agent and then dried and activated by heating the composition so obtained to a temperature of at least about 200° C. but not above about 550° C. When an alpha-olefin is to be dimerized to a liquid olefin, it is preferred that the catalyst used for this polymerization step be one which is activated by heating the catalyst composition prepared as described above to a temperature not above about 300° C. When the olefin being dimerized is an internal olefin having say from 5 to about 10 carbon atoms per molecule, e.g., hexene-2, it is preferred to use a catalyst activated by heating it to a temperature in the higher part of the given range, i.e., from about 300° to 550° C. preferably from 450° to 500° C. We have also discovered that the preferred lower activation temperatures give an active catalyst which eliminates or at least minimizes the formation of 2-methylpentene-2 in propylene polymerization.

The activated carbons useful for the purpose of this invention may be of any porous carbon known to be useful for catalyst preparation. The activated carbons of this type generally have surface areas of from about 400 sq. m. to 2000 sq. m. per gram. These carbons may be in the form of compact masses, granules, chips, powder, etc., although the powder form is not preferred. The activated carbons may be from animal or vegetable or petroleum source. For example, there may be used coconut charcoal, wood charcoal, and coke derived from coal, but natural untreated coal itself does not give an effective catalyst for use in the process of this invention, and is not an activated carbon. Other useful carbons include soft bone charcoal, hard bone charcoal, and carbons sold under various trade names for catalyst preparation purposes. Examples of activated carbons sold in commerce include Pittsburgh "BPL," "CAL," "OL," and "SGL" of Pittsburgh Coke and Chemical Co., Girdler "G–32–C," and "G–32–E" of Chemical Products Division, Chemetron Corp., and Barnebey-Cheney Company's "EE–1," "E–H–1" and other activated carbons. The activated carbons may be washed or unwashed. If the carbon is to be washed a typical wash treatment comprises washing the carbon with aqueous nitric acid, e.g., a dilute nitric acid solution, employing for example about 600–1000 ml. of nitric acid per 500 g. of charcoal. The nitric acid can be of any desired concentration but preferably has a concentration of about 10 to 30 weight percent in water. Contact periods of nitric acid and charcoal of about 5 minutes to 0.5 hour are sufficient to wash the carbon. After the acid wash step the acid treated carbon may be washed with water to remove the acid prior to the ammoniation treatment of the carbon.

As described above the carbon is preferably dried to insure constant weight and accurate determination of catalyst weights which follow. After drying (about 4 hours at 100–120°C. in a vacuum oven is generally sufficient) the carbon is amomniated in accordance with this invention with ammonia gas, liquid ammonia, or aqueous ammonium hydroxide which may be dilute or concentrated, i.e., the ammonium hydroxide solution is preferably concentrated (15 to 30% by weight) although more dilute amomnium hydroxide solutions may also be used. In a typical ammoniation treatment the carbon is treated with ammonium hydroxide, preferably in portions, until the carbon will not take up any more ammonium hydroxide (either by absorption or adsorption). When the carbon is completely soaked in the ammonium hydroxide solution, which can be insured by allowing the "wet" carbon to stand for from 0.25 hour to 1 hour or longer; the treated carbon is dried by any means known in the art. A good procedure which can be used to dry the ammonium hydroxide impregnated carbon is to heat the carbon to form 80 to 150° under vacuum until the carbon is substantially dry to the touch. Time periods of from 0.25 to 5 hours are generally sufficient to accomplish this if the impregnated carbon is agitated as by stirring, tumbling, shaking, etc.

After the necessary ammoniation treatment the dried carbon is impregnated with a solution, preferably aqueous, of the desired amount of the cobalt salt. The cobalt salt solution used is one having a concentration which is calculated to give the desired amount of cobalt oxide on the carbon when activated. Catalysts containing from about 1 to about 50% by weight of cobalt may be used. Preferred catalysts are those containing from about 5% to about 30% by weight of cobalt for the gaseous alpha-olefin polymerization, and from about 2% to about 50% in the liquid olefin dimerizations. For example, a solution of 200 g. of cobalt nitrate.6 $H_2O$ in 250 ml. of demineralized water was used in preparing one catalyst composition by impregnating this solution into 330 g. of ammonium hydroxide treated carbon. After impregnation, the colbalt salt treated carbon is then dried until outwardly dry, e.g., by warming as described above for from 1 to 20 hours, with occasional agitation to obtain a uniformly treated carbon.

We have found it to be particularly valuable to the polymerization process of this invention to treat a dried cobalt salt-impregnated carbon to an additional ammoniation treatment prior to activation of the catalyst. Although we do not care to be bound by any particular theory, we believe that the ammoniation treatment serves to stabilze the active catalytic form of cobalt on the carbon so hat the catalyst composition aids in giving the desired type of dimer product. The ammoniation treatment may be done batch-wise or continuously by suitable choice of equipment. The treated carbon is allowed to take up as much ammoniating agent as it is able, and then the thus treated carbon is dried as before, and activated.

The cobalt salt containing carbon preferably after being ammoniated as described above, is heated to obtain the active catalyst composition. The activation temperature is critical to the type of dimerization to be conducted with the catalyst. For dimerizing alpha-olefins, e.g., ethylene, propylene, 1-hexene, etc. to products which are liquids under ordinary conditions the above prepared composition is preferably activated at a temperature above 200° C. but not higher than about 300° C.

Catalysts activated at temperatures above about 300° C. may be used if increased amounts of branches chain isomerization products such as 2-methylpentene-2 which arises from cis- and trans-4-methylpentene-2 in the propylene dimer product are not detrimental to the purposes for which the product is intended to be used. When the olefin feed is substantially only the alpha-olefin to be dimerized we prefer to use the catalyst activated by heating it at the lower temperature, i.e., preferably 260°–300° C. However, to cause the dimerization of internal olefins, advantage can be taken of the isomerization activity of the catalysts resulting from the high temperature activation. For example, when hexene-2 is passed over the ammoniated cobalt oxide on carbon catalyst activated in the higher portion of the temperature range, e.g., 450° C. to 550° C., a substantial amount is isomerized to hexene-1 which dimerizes to a twelve carbon olefin.

The activation of the catalyst composition is conducted in the presence of an inert atmosphere which may be an inert gas such as nitrogen, helium, methane, propane, carbon dioxide, ammonia, or a vacuum atmosphere etc. Optionally, the catalyst may be heated in the presence of air to the desired temperature, and then the air may be flushed out or removed and replaced with an inert gas for a short time prior to the termination of the activation treatment. For example, in continuous runs for polymerizing the olefin, the catalyst is placed in a basket and gas or liquid feed is passed through this basket. It is within the scope of this invention to activate the catalyst composition by heating it in air for a time and then just prior to its use in the continuous polymerization process, to pass an inert gas over it for a short time, say, from 0.1 to 1 hour at the desired activation temperature just prior to the polymerization reaction.

The time period for the activation treatment can be any period required to raise the temperature of the catalyst composition to the desired temperature. Generally, time periods from 0.5 to 10 hours are sufficient to activate the catalyst to the desired activity. Preferred times of from 2 to 5 hours are used to insure complete activation in efficient time periods. Often times the catalyst composition is activated by gradually raising the temperature from the last drying step under vacuum to the desired temperature. For example, optimum activation conditions for preparing a catalyst for use in dimerizing propylene to products useful in preparing biodegradable olefins in an economical manner involve heating the dried ammoniated carbon impregnated with cobalt nitrate, and re-ammoniated (termed the post-treatment) to a temperature of about 200° C. to 280° C. while passing an inert gas, such as nitrogen, through the activation vessel for from 0 to 5 hours under vacuum of about 5 to 760 mm. of mercury, preferably 35 to 50 mm. of mercury.

Just prior to use in the polymerization reaction but after activation it is preferred that the catalyst should not be in contact with air. To prevent this we have transferred the activated catalyst from one container to another, especially for use in batch type reactions as needed, under nitrogen or other inert atmosphere to prevent any possible deactivation by deleterious materials. However, we have found that if these catalysts are exposed to air in an amount to deactivate them for alpha-olefin dimerization reactions of this invention, the catalyst can be reactivated by heat treatment under the conditions described above.

We have found according to this invention that catalyst compositions prepared and activated as described above substantially improve the dimer isomer distribution ratio in the low boiling liquid product obtained by polymerizing gaseous alpha-olefins using the above described catalysts. Activation temperatures for these catalysts below about 300° C. are essential to this improved isomer ratio since when temperatures above about 300° C. are used to activate the catalyst, and then the catalyst is used to polymerize alpha-olefins, there are obtained in the liquid dimer product increased amounts of undesired isomers of the desired dimer products. This problem is particularly acute because some of these undesired isomers are not easily separated from the desired liquid dimer fraction. For example, when propylene is polymerized using a cobalt oxide on carbon catalyst prepared as described above but activated at temperatures above 300° C. the hexene fraction contains not only the desired n-hexenes but 2-methylpentene-2 which is undesired for detergent preparation purposes and which is only difficulty removed therefrom. However, when a catalyst composition prepared as described above, was activated at temperatures below 300° C., e.g., at about 275° C., very little or none of 2-methylpentene-2-isomer appeared in the n-hexene product.

When dimerizing internal olefins the ammoniated CoO/C catalyst composition used should be one which has been activated in the higher portion of the above indicated temperature range and preferably at a temperature of from about 450° C. to 550° C. Catalysts of this invention, when activated at the above temperatures, are extremely active olefin isomerization catalysts. Alpha-olefins are the only olefins which will dimerize over CoO/C activated at any temperature. The isomerization activity of the catalysts activated at the higher temperature cause the isomerization of some of the internal olefins to alpha-olefins which readily dimerize under the conditions present.

The exact chemical structure of the catalyst compositions prepared as described above is not known but analysis has shown that in the carbon matrix the cobalt is always present as a larger percentage of cobalt oxides and a smaller amount of metallic cobalt. This is characteristic of these catalysts. The cobalt oxides present are predominantly cobaltous oxide with minor amounts of cobaltic oxide. The cobalt oxide content of the catalyst composition is always greater than that of cobalt metal as determined by the analytical method reported in Young, R. S. (editor), Cobalt, New York: Reinhold Publishing Corporation, 1960, pp. 392–394, adapted for determination of cobalt on a carbon carrier as described in Example 6 hereinbelow.

A particular embodiment of this invention provides a two step dimerization process in which the same catalyst, prepared as described above, but activated at different temperatures is used to prepare liquid olefins which are useful for alkylation reactions for preparing biodegradable detergents. Briefly, in the first step a gaseous alpha-olefin is dimerized to a low-boiling liquid olefin product, the major proportion of which is straight chained, using an ammoniated cobalt oxide on carbon catalyst which had been activated by heating it for from 200° C. to 300° C. in an inert atmosphere. The straight chained product including the internal olefins, is preferably separated from the branched chained fraction of the product, although separation is not essential, and then dimerized by using a cobalt oxide on carbon catalyst prepared as described above with or without the ammoniation treatment but activated by heating to from 300° C. to 550° C. preferably at 450°–550° C. in an inert atmosphere. The cobalt oxide on carbon catalyst used in the second dimerization step of this two dimerization step embodiment is preferably ammoniated as described above but it need not be so ammoniated for operation within the scope of the invention. These conditions effect substantial isomerization of the internal olefins to terminal olefins which dimerizes to higher boiling liquid olefins.

An illustrative example of this two step dimerization process involves the dimerization of propylene to a low-boiling liquid olefin product by contacting propylene with the ammoniated cobalt oxide on carbon catalyst activated to about 260° C. to 300° C., typically 275° C. in an inert atmosphere, at temperatures of from about 10° to 150° C., raising the dimerization temperature as the activity of the catalyst falls off, preferably separating the straight chained from branched chained hexene product, and subjecting the mixture of straight chained hexenes to a dimerization reaction at temperatures of about 100° C. to about 250° C. using the cobalt oxide on carbon catalyst activated by heating it in an inert atmosphere to higher temperatures, preferably 450° C. to 550° C. to obtain a twelve carbon liquid olefin product which is especially useful for alkylating arene compounds in the making of biodegradable detergents.

The polymerization process of this invention is conducted by contacting the olefin with a catalyst, described above, at temperatures of from about −10° to 250° C., preferably at temperatures of from about 10° C. to 150° C. for $C_2$–$C_4$ olefins, and 80° to 250° C. for $C_5$–$C_{10}$ olefins at pressures of from atmospheric to 2500 p.s.i.g., preferably at from about 150 p.s.i.g. to 1000 p.s.i.g. Although the reaction will proceed at atmospheric pressure the conversion is low so that an optimum pressure of from about 150 p.s.i.g. to 1000 p.s.i.g. is desirably used. Reaction temperatures below those stated may be used but at such temperatures the rate of conversion of alpha-olefin to dimer product is slow. At temperatures much above that stated the life of the catalyst is shortened to an undesired extent, i.e., the catalyst becomes inactive in much shorter time periods at such temperatures. The above conditions are applicable when either a one or two step process is used to obtain $C_{10}$–$C_{20}$ olefins. Within the given pressure ranges no substantial difference in isomer distribution of product to branched chain isomers appears to be obtained. However, with decreasing catalyst activity increasing selectivity with respect to the favoring of production of straight chain olefins is observed.

Various types of reactor equipment can be used to conduct the polymerization reaction of this invention. The process can be adapted to use in rocking autoclave systems, fluidized bed systems, continuous tubular flow reactor systems, etc., which are known in the art for preparing liquid polymer products. The process may be conducted by reacting the olefin in a liquid slurry system at atmospheric pressure, but elevated pressures, as described are preferred. In autoclave systems the reaction is conducted under autogenous pressures which can vary from atmospheric to 1000 p.s.i.g depending upon the size of the reactor, the temperature of reaction, the amount of catalyst used, etc. In continuous flow reactors employing a fixed bed of catalyst wherein the gaseous or liquified olefin is passed over or through the catalyst bed, weight space velocities of the olefin feed can be varied between about 0.1 and about 40 g. of olefin per hour per gram of catalyst composition.

A preferred method of operation of the process is to pass the olefin-containing feed under pressure through filter, or molecular sieve devices, which are known in the art, to insure removal of any substantial amounts of water or materials which may poison the catalyst and then into the reactor at pressures sufficient to keep most if not all of the olefin feed in the liquid phase, and through the catalyst bed.

The temperature of the reaction mixture is kept at the desired temperature by warming devices, such as oil baths, or steam jackets. When operation at ambient temperature is desired no heating device need be used. When the olefin reactant is a two to four carbon olefin the process of the invention operates well by allowing the olefin-containing feed to pass through the catalyst bed at room temperature and allowing the temperature to rise somewhat as a result of the slight exothermic nature of the reaction. When the olefin being treated has a higher number of carbon atoms it is preferred to conduct the dimerization at temperatures ranging from 80° to 250° C. This technique works especially well with new catalyst materials. As the activity of the catalyst falls off, we have found that the activity can be raised by then raising the temperature to from 75° to 150° or 250° C. The olefin conversion rate to dimer may be kept at a fairly constant rate by using lower olefin feed flow rates through the catalyst bed, e.g., from 0.1 to 2 grams of olefin per gram of catalyst per hour. Reactor pressures of from about 500 to about 900 p.s.i.g. are preferred for maintaining liquid contact at temperatures of from 10° to 150° C. of olefin feed with catalyst. However, lower pressures, on the order of down to 50 to 300 p.s.i.g. may be used. At these lower pressures, a portion of any normally gaseous olefin may be in the gaseous phase. While high flow rates of olefin over the catalysts are usually initially used, (20 to 40 g. of olefin per gram of catalyst per hr.) the rate of conversion may be maintained at a fairly high level by reducing the flow rate as the activity of the catalyst falls off.

The olefin feed may contain, besides the olefin up to, say, 50% of paraffin hydrocarbon of the same number of carbon atoms. Higher quantities of the paraffin may be used, however, at the expense of the loss of some conversion of olefin to dimer. The feed may also contain trace amounts of certain sulfur containing compounds such as thiophene and 1,2-ethanedithiol. Quantities of such compounds on the order of from 10 to 20 p.p.m. of feed actually enhance the conversion of the olefin to dimer, although quantities much in excess of 30 p.p.m. tend to reduce the conversion. We have found that for this catalyst system, compounds such as carbon monoxide, and dienes, i.e., diolefins, alkynes, act as poisons, causing a reduction in the activity of the catalyst and hence should be avoided.

The invention is further illustrated by the following examples which illustrate various aspects of the invention.

EXAMPLE 1

(A) *Ammonium hydroxide treatment*

This example illustrates a method for preparing the ammoniated catalyst of this invention using ammonium hydroxide as the ammoniating agent.

To 330 g. of a commercial grade (BPL) activated carbon there was added 300 ml. of concentrated ammonium hydroxide. All of the ammonium hydroxide was absorbed. The ammonium hydroxide treated activated carbon was dried by heating it on a hot plate for two hours at about 130° C. A slight ammonia odor was noted. There was then added to the dried carbon, thus obtained, a solution of 200 g. of cobalt nitrate hexahydrate in 250 ml. of demineralized water. Almost all of the solution was absorbed. The cobalt nitrate-impregnated carbon was dried by placing the vessel containing the treated carbon on a hot plate at low heat for 3 hours. The treated carbon was periodically stirred during the heating until the treated carbon was outwardly "dry," i.e., there was no visible liquid or water on the treated carbon. The "dry" treated carbon weighed about 590 g. The treated carbon was placed in a vacuum oven overnight (18 hours) at 120° C. The weight of the treated carbon was now 395 g. When no further ammonium hydroxide treatment is contemplated the treated carbon was activated by heating it under vacuum gradually to 274° C.

However, we have found that it is better to use a double ammonium hydroxide treated cobalt oxide on activated carbon as catalyst for this type of polymerization. For this purpose, the outwardly dry cobalt nitrate impregnated activated carbon which had been dried overnight at 120° C. in a vacuum oven (395 g.), there was added 390 ml. of concentrated aqueous ammonium hydroxide which was absorbed rapidly. After stirring to obtain homogeneity an additional 110 ml. of concentrated aqueous ammonium hydroxide was added. The wet double base treated composition thus obtained was heated on a hot plate at low heat until it was outwardly dry (about 4 hours). It was then placed in a vacuum oven at 120° C. for 25 hours (391 g.).

(B) *Activation step*

The following illustrates how a catalyst for this invention is activated.

A 90 g. portion of an ammonium hydroxide treated cobalt nitrate on carbon, prepared as described above, was placed in an activating tube. The pressure was reduced to 35 mm. and a nitrogen gas flow through the tube at about 80 ml./min. was begun. The temperature was gradually raised to 264° C. over 130 minutes and kept below 275° C. over about the next four hours. The activated catalyst so obtained was poured into bottles while keeping it under nitrogen at all times.

EXAMPLE 2

This Example 2 illustrates the advantages of using the ammonium hydroxide wash treatment on the carbon which is used to prepare the catalyst of this invention.

Various batches of carbon were washed with acid, as indicated below, dried, and then treated, with the indicated basic materials, dried again, and then used to prepare catalyst compositions as described in Example 1. The table shows the effect of the various treatments on the catalytic activity when the resulting catalysts were used to dimerize propylene under otherwise similar conditions.

| Acid Wash Agent | Base | Conversion (g. of product/g. of catalyst) | Percent n-hexenes | Remarks |
|---|---|---|---|---|
| $HNO_3$ | $NH_4OH$ | 13.8 | 59.0 | (1) |
| $HNO_3$ | None | 3.3 | 57.0 | (2) |
| $HNO_3$ | $CH_3NH_2$ | 4.6 | 55.3 | (1) |
| $HNO_3$ | $(CH_3)_3N$ | 4.2 | 55.0 | (1) |
| $HNO_3$ | t-$BuNH_2$ | 12.5 | 61.0 | (2) |
| $HNO_3$ | LiOH | 6.1 | 60.2 | (1) |
| $HNO_3$ | NaOH | 3.7 | 59.9 | (1) |
| $HNO_3$ | Pyridine | 8.0 | 63.5 | (1) |
| HCl | $NH_4OH$ | 11.2 | 58.0 | (1) |
| HCl | None | 6.8 | 57.0 | (1) |

[1] Less than 2% of 2-methylpentene-2-content.
[2] Had greater than 2% 2-methylpentene-2 content despite activation at only 275° C. in nitrogen.

EXAMPLE 3

In a standard tubular flow reactor, the catalyst basket was loaded under nitrogen with about 9.0 of activated catalyst, prepared as described in Example 1. The tubular reactor was then flushed with nitrogen, and then with the nitrogen still flowing through the reactor the catalyst basket containing the catalyst was inserted. The reactor was sealed and pressurized to 180 p.s.i.g. with nitrogen. The alphaolefin was then pumped into the reactor and maintained at a pressure of 750 p.s.i.g. at an initial space velocity of 25–33 grams of olefin/g. of catalyst/per hour. The temperature of the reactor was controlled by water cooling when necessary. The product of the reaction was collected in a trap maintained at −35° to −37° C. The results of several typical runs are shown in the following table:

| Run | Ave. Space Velocity, g. $C_3H_6$/g. of cat./hour | Total Propylene (g.) | Total Dimer (g.) | Percent Conversion Overall | Aver. Production Overall (g./g. cat./hr.) | Total Production g. product/g. catalyst | Catalyst type | Wt. (g.) | Time (hours) |
|---|---|---|---|---|---|---|---|---|---|
| 1 [1] | 1.66 | 44,000 | 4,049 | 9.2 | 0.153 | 112.5 | 13% CoO/C A–B [2] | 36.0 | 736 |
| 7 [1] | 9.47 | 10,176 | 949 | 9.3 | 0.940 | 100.9 | 13% CoO/C B [3] | 9.4 | 107.5 |
| 8 [1] | 10.72 | 20,345 | 2,072 | 10.2 | 1.14 | 215.8 | 13% CoO/C BB [4] | 9.6 | 189 |
| 49 [5] | 17.6 | 35,183 | 5,458.6 | 15.5 | 2.73 | 606.5 | 13% CoO/C BB | 9.0 | 222 |
| 50 [5] | 15.4 | 4,688+50% propane | 773.5 | 16.5 | 1.89 | 88.9 | 13% CoO/C BB | 8.7 | 47 |
| 97 [6] | 12.5 | 52,814 | 6,167.9 | 11.6 | 1.46 | 597.9 | 13% CoO/C BB | 10.3 | 409.5 |
| 153 | 13.3 | 51,840 | 5,380.0 | 10.4 | 1.38 | 689.7 | 13% CoO/C BB | 7.8 | 500 |

[1] Runs 1, 7, and 8 were made having reactor in oil bath at 85° C., with catalyst having about 13% CoO on carbon.
[2] AB denotes $HNO_3$ washed (A) carbon which was then treated with $NH_4OH$ (B).
[3] B denotes carbon treated with $NH_4OH$ only.
[4] BB denotes carbon treated with $NH_4OH$ before cobalt nitrate impregnation, and then $NH_4OH$ treated again after such impregnation.
[5] Runs 49 and 50 were done at ambient temperature allowing reactor to reach its own internal reaction temperature, using a 30° C. cooling water bath.
[6] In early part of run (at time 20 hours) about 60% of product was n-hexenes (productivity 4.8 g. product/g. catalyst/hour). Later (at time 409 hours) the dimer product was 73.8% n-hexenes (productivity was 0.3 g. product/g. catalyst/hour).

EXAMPLE 4

This example illustrates the polymerization of a normally gaseous alpha-olefin using a catalyst prepared as described in Example 1 in a batch process.

The following procedure was used.

In a 300 ml. rocking type bomb reactor there is placed between about 2 to 4 g. of the cobalt oxide on carbon catalyst, prepared as described in Example 1, and 10 ml. of heptane (optional). The bomb was then closed and cooled in a dry ice-acetone bath. The alpha-olefin containing gas for the following runs was 99.9% pure propylene. It was fed into the bomb until about 100 g. of gas was added. The bomb was then placed in a rocker agitator and the contents of the bomb were warmed to 85° C. over 0.5 to 1 hour and kept at 85° C. for 5 hours to insure complete reaction. The bomb and its contents were then cooled to room temperature, vented of any unreacted alpha-olefin, and the liquid content thereof was separated from the catalyst. Conversion was expressed in terms of grams of product per gram of catalyst. The results of bomb runs made with the different catalyst systems are given in the following table:

| Run | Catalyst | Conversion of $C_3H_6$. g. product/g. of catalyst |
|---|---|---|
| 1 | CoO/carbon* [a] | 8.02 (average of 18 runs). |
| 2 | CoO/B-carbon [b] | 13.04 (average of 11 runs). |
| 3 | B-CoO/B-carbon [c] | 28.50 (average of 10 runs). |

[a] No $NH_4OH$ treatment.
[b] $NH_4OH$ treatment of carbon before impregnation with cobalt nitrate.
[c] $NH_4OH$ treatment of carbon before and after impregnation with cobalt nitrate.
*The carbon used in each run (1-3) was Pittsburgh Coke and Chemical Co.'s type BPL carbon.

EXAMPLE 5

This example illustrates the advantages of polymerizing gaseous alpha-olefins using catalysts activated according to the teachings of this invention over those activated at higher temperatures, and those activated using hydrogen. For purposes of this comparison each catalyst composition was prepared by washing Pittsburgh Coke and Chemical Co. type BPL carbon with nitric acid, drying, and then washing the acid washed carbon with ammonium hydroxide before drying and impregnation with sufficient cobalt nitrate solution to give about 13% CoO on the carbon. The analyses of the $C_6$ propylene dimer fraction was as follows, using catalysts activated at the indicated temperatures:

|  | 1 | 2 | 3 |
|---|---|---|---|
| Activation Temperature (° C.). | 240° in $N_2$ | 300° in $H_2$ | 360° in $N_2$. |
| Conversion (g. product/ g. catalyst). | 19.0 | 7.9 | 15.2. |
| Product Distribution (Percent): |  |  |  |
| n-Hexenes | 57.28 | 59.03 | 55.64. |
| Methylpentenes | 42.72 | 40.97 | 44.36. |
| 4-methylpentene-1 | 4.53 | 1.74 | 2.01. |
| Cis-4-methylpentene-2 | 12.68 | 2.90 | 2.88. |
| Trans-4-methylpentene-2. | 25.51 | 21.54 | 28.76. |
| Hexene-1 plus 2-MP-1 | 5.28 | 5.87 | 3.74. |
| Trans-hexene-3 | 4.15 | 12.55 | 12.87. |
| Cis-hexene-3 plus trans-hexene-2. | 30.19 | 27.34 | 28.32. |
| Cis-hexene-2 | 17.66 | 13.27 | 10.71. |
| 2-methylpentene-2 | Trace [1] | 14.69 | 10.71. |

[1] Less than 0.5 percent.

EXAMPLE 6

This example illustrates that the catalyst compositions of this invention have a cobalt oxide to cobalt ratio in excess of 1:1, i.e., the cobalt oxide content always exceeds the cobalt metal content of the catalyst.

Various cobalt oxide containing carbon catalyst compositions were prepared, as indicated, and activated in nitrogen to different temperatures. The catalyst compositions were then analyzed for total cobalt content, percent cobalt metal, percent cobaltous oxide as cobalt, and percent cobaltic oxide as cobalt.

The analytical method used was that reported in Young, R. S. (editor), Cobalt, New York: Reinhold Publishing Corporation, 1960, pages 392–394, adapted for determination of cobalt on a carbon carrier.

Briefly, the method involved extraction of metallic cobalt from the catalyst composition sample with gaseous chlorine in anhydrous methyl alcohol, extraction with acetic acid of cobaltous cobalt from the residue obtained from metallic cobalt extraction, with the residue remaining thereafter being treated with aqua regia to destroy organic matter and reporting of any residual cobalt as cobaltic cobalt. The cobalt extracted by the above procedures were then titrated in warm sodium acetate buffer solution with standard ethylenediaminetetracetic acid (EDTA) using Xyleneol Orange indicator. The precentages of cobalt metal were made using the following equation, Percent $Co = K(^V EDTA/\text{grams of catalyst sample})$ where $$K = ^M EDTA \times 0.05894 \times \frac{\text{ml. solution of cobalt}}{\text{ml. of aliquot}}$$

$^M EDTA$ is the molarity of the EDTA solution
$^V EDTA$ is the volume (in mls.) of EDTA used in the titration In the cobaltous oxide and cobaltic oxide titrations percent CoO and percent $Co_2O_3$–$Co_3O_4$ were substituted for percent Co in the above equation. The percent of the cobaltous and cobaltic oxides as found above are expressed as percent cobalt. The results are tabulated below:

| No. | Catalyst Sample | Percent Total Co | Percent Co Metal | Percent CoO as Co° | Percent $Co_2O_3$ as Co |
|---|---|---|---|---|---|
| 1 | CoO on $HNO_3$ washed-$NH_4OH$-treated carbon activated to 550° C | 11.20 | 5.40 | 5.54 | 0.26 |
| 2 | CoO on $HNO_3$ washed-$NH_4OH$ treated carbon activated at 230° C | 10.79 | 3.84 | 6.57 | 0.38 |
| 3 | CoO on $NH_4OH$ treated carbon which was $NH_4OH$-treated again after $Co(NO_3)$ impregnation activated to 275° C. | 9.76 | 2.06 | 7.42 | 0.28 |
| 4 | $NH_4OH$-treated $Co(NO_3)_2$ impregnated $NH_4OH$-treated carbon activated for 5 hr at 275° C. | 10.54 | 2.37 | 7.98 | 0.19 |
| 5 | Same as 4, after catalyst is used in $C_3H_6$ polymerization run | 10.54 | 1.58 | 7.70 | 1.27 |
| 6 | $Co(NO_3)_2$ on carbon (no $NH_4OH$ treatment) activated at 275° | 10.20 | 6.32 | 3.80 | 0.03 |

EXAMPLE 7

This example illustrates that by using lower activation temperatures in preparing the catalyst compositions of this invention liquid dimer products having a substantially lower 2-methylpentene-2 content can be obtained when these catalysts are used in polymerizing normally gaseous alpha-olefins, and compares a known catalyst system activated under the same conditions.

For this example a series of cobalt oxide on carbon catalysts were prepared so that each catalyst contained about 13% by weight, of cobalt oxide. For runs I, and II, the cobalt nitrate solution was impregnated on $NH_4OH$ treated carbon as described in Example I, and after the cobalt nitrate impregnated/$NH_4OH$ treated carbon was dried, it was impregnated again with $NH_4OH$ (termed a double base treated catalyst).

For runs III and IV the cobalt nitrate solution was impregnated into $NH_4OH$ treated carbon, as described in Example 1, with no further $NH_4OH$ treatment before activation (termed a single base treated catalyst).

For runs V and VI the cobalt nitrate solution was impregnated into carbon which had been washed with $HNO_3$ according to prior art teachings but which had not been treated with $NH_4OH$.

The catalysts used in runs I, III, and V were then activated at 275° C. in a flowing nitrogen stream flowing at a rate of about 87 ml./min. for two hours under vacuum of about 35 mm.

The catalysts used in runs II, IV, and VI were activated at 375° C., in a flowing nitrogen stream under a vacuum as above.

The catalysts so activated were then used to polymerize propylene according to the following procedure.

Into a conventional 300 ml. bomb reactor there was placed between 2 and 3 grams (quantities varied between 2.2 and 2.8 g.) of activated catalyst, 6.8 g. (10 ml.) of heptane, and 100 g. of propylene. The bombs were sealed and maintained at 85° C. for 5 hours. The bombs were then vented of any unreacted propylene, the contents removed, and the liquid separated from the wet catalyst. The dimer fraction was then collected and analyzed by standard vapor phase chromatography techniques to determine the type and amount of isomers present. The results of the six runs I–VI were as follows, with the amounts being percent of the $C_6$ fraction which constituted about 95% of the total product in each run. The differences in the total weight of each run from 100% is the result of rounding off second decimal places for convenience.

polymerization product. The $C_6$ fraction of the product was then analyzed for 2-MP-2 content.

The results were as follows for the respective catalysts:

| | Catalyst Activation Temp. (° C.) | Percent-2-MP-2 in $C_6$ fraction |
|---|---|---|
| I | 150 | (1) |
| II | 200–230 | 0 |
| III | 240 | 0 |
| IV | 275 | 0 |
| V | 300 | 1–5 |
| VI | 365 | 10.7 |
| VII | 400 | 15.0 |
| VIII | 450 | 26.5 |

[1] No $C_3H_6$ dimer formed.

Results similar to those given above are obtained when the catalyst used is a double $NH_4OH$ treated catalyst, i.e.,

| | Run No. | | | | | |
|---|---|---|---|---|---|---|
| | I | II | III | IV | V | VI |
| Type of Catalyst | Double NH₄OH Treated | Double NH₄OH Treated | Single NH₄OH Treated | Single NH₄OH Treated | HNO₃ Treated | HNO₃ Treated |
| Activation Temp. (° C.) | 275 | 375 | 275 | 375 | 275 | 375 |
| Components (percent): (1) | | | | | | |
| 4-MP-1 | 3.93 | 2.58 | 4.81 | 3.17 | 3.12 | 2.06 |
| c-4MP-2 | 11.15 | 7.35 | 14.32 | 8.72 | 9.13 | 6.20 |
| t-4MP-2 | 27.19 | 23.99 | 20.92 | 30.45 | 28.25 | 24.99 |
| 2,3-DMB-1 | 0.68 | 0.89 | 0.37 | 0.69 | 0.55 | 1.24 |
| H-1 | 2.00 | 1.35 | 2.72 | 1.60 | 1.40 | 1.17 |
| 2-MP-1 | 3.74 | 3.81 | 4.40 | 3.50 | 3.36 | 3.00 |
| t-H-3 | 5.54 | 10.46 | 3.01 | 7.51 | 7.61 | 10.96 |
| c-H-3 | 1.93 | 2.09 | 1.14 | 1.53 | 1.56 | 2.15 |
| t-H-2 | 28.80 | 30.70 | 29.74 | 28.74 | 30.43 | 28.97 |
| 2-MP-2 | 2.06 | 5.90 | 0.95 | 2.74 | 2.65 | 9.66 |
| c-H-2 | 12.98 | 10.86 | 17.62 | 11.34 | 11.94 | 9.59 |
| Total straight chain, percent | 51.25 | 55.48 | 54.23 | 51.33 | 52.94 | 52.85 |
| Total branched chain, percent | 48.75 | 44.52 | 45.77 | 48.67 | 47.06 | 47.15 |

(1) In isomer names: M is methyl, P is pentene, B is butene, H is hexene, e.g., 4-MP-1 is 4-methylpentene-1; c is cis, t is trans, e.g. c-H-3 is cis-hexene-3.

It can be seen from the given data that the higher activation temperatures give catalysts which cause the formation of up to three times as much 2-methylpentene-2 in the $C_6$ fraction of the polymerization product of propylene as that produced in $C_6$ fractions produced using catalysts activated at the lower preferred temperatures.

EXAMPLE 8

This example shows that when there is used in a propylene polymerization reaction of this invention a catalyst which has been activated at temperatures above about 300° C., the percentage of 2-methylpentene-2 (2-MP-2) increases in proportion to the increase in heating step temperature used to activate the catalyst.

A series of catalyst compositions prepared in accordance with this invention by impregnating a previously nitric acid washed activated carbon with ammonium hydroxide, drying the thus treated activated carbon, impregnating the dried acid washed ammonium hydroxide treated carbon with an aqueous cobalt nitrate solution, drying the cobalt nitrate impregnated carbon, were activated to different temperatures ranging from 150° C. to 450° C., under flowing nitrogen at a vacuum of about 50 mm.

The catalyst compositions so activated were then used to polymerize propylene under similar conditions.

Into a bomb reactor there was placed between about 2 to 6 gm. of the activated catalyst, 10 ml. of heptane, and from about 80 to 100 g. of propylene. The bomb was sealed and run for about 5 hours at 85° C. The bomb reactor was then vented of unreacted propylene, and emptied of its contents. The liquid product was separated from the wet catalyst and weighed. The weight of the heptane was subtracted to determine the amount of a catalyst obtained by treating with $NH_4OH$ a cobalt salt impregnated $NH_4OH$ treated carbon, as described in Example 1.

EXAMPLE 9

This example illustrates the polymerization of ethylene using the catalyst of this invention to get improved yields of hexene fractions in the liquid polymer product.

The catalyst used was prepared by adding 165 g. of activated carbon, which had been impregnated with ammonium hydroxide until it would take up no more, and then dried, to a solution of 97 g. of cobaltous nitrate hexahydrate in 165 ml. of water (equivalent to 25 g. of cobalt oxide). The carbon so impregnated with cobalt nitrate was dried on a hot plate in a hood until the surface was superficially dry, and then vacuum dried for 4 hours. To the dried catalyst there was added 330 ml. of concentrated ammonium hydroxide. The catalyst so treated was dried on a hot plate in a hood as above, and then vacuum dried for 6.5 hours after which time the catalyst weight was 201.0 g. A 37.0 g. portion of the catalyst, so prepared, was activated by heating it to 275° C. in 0.5 hour and then held at that temperature for 2 hours in a flowing nitrogen stream of 87 ml./min. under a vacuum of about 35 mm.

A conventional rocking type bomb reactor was then loaded with 2.6 g. of the catalyst, prepared and activated as above, and 127.0 g. of ethylene. The reactor was sealed and placed in the rocker agitator and allowed to run for 24 hours at room temperature. After this time the bomb was cooled in a Dry Ice-acetone mixture before opening and venting off the 2.0 g. of unreacted ethylene. The liquid product was separated from the wet catalyst.

The total liquid product weighed 120.1 g. for a conversion of 94.6% or 46.2 g. of liquid product per g. of catalyst.

The liquid ethylene polymer product was determined by vapor phase chromatographic analysis to contain 26.23% butenes, 53.86% hexenes, and about 19.93% of higher liquid olefin products.

Of the hexane fraction 83.15% was straight chain and only 16.86% was branched chain hexenes. The straight chain fraction analyzed as follows:

| Isomer [1]: | Percent by weight |
|---|---|
| H-1 | 0.96 |
| t-H-2 | 27.25 |
| c-H-2 | 11.93 |
| t-H-3 | 33.16 |
| c-H-3 | 9.85 |

[1] The symbols here are the same as are described in Example 7.

EXAMPLE 10

This example illustrates the invention wherein propylene is polymerized at room temperature using a double ammonium hydroxide-treated cobalt oxide on carbon catalyst, prepared as described in Example 1.

In a conventional bomb reactor there was placed 2.4 g. of a catalyst prepared as described in Example 9, a 9.9 g. portion of which was activated separately by heating to 275° C. over 35 minutes and then held at this temperature for 2 hours in a nitrogen stream (87 ml./min.) under 35 mm. vacuum, and 137.0 g. of propylene. The bomb was sealed, placed in an agitator and shaken at room temperature for 5 hours. The bomb reactor was then vented of unreacted propylene and the contents emptied. The liquid fraction was separated from the wet catalyst. The total liquid product was 126.4 g. (92.3% conversion) or 52.66 g. of product per gram of catalyst.

EXAMPLE 11

This example illustrates the dimerization of a liquid alpha-olefin using a catalyst prepared in accordance with this invention.

In a bomb reactor there was placed 150 ml. of hexene-1 and 2.5 g. of a catalyst prepared by ammoniating a cobalt nitrate impregnated ammoniated carbon, as described in Example 1, and activating it to 450° C. in nitrogen at a flow rate of 87 ml. per minute at 35 mm. vacuum for 2 hours.

The bomb was sealed, placed in the rocker mechanism, and heated at 150° C. for 12 hours with rocker agitation. After this time the bomb was cooled, emptied of its contents and the liquid was separated from the wet catalyst. The weight of the recovered liquid was 94.0 g. The wet catalyst weighed 3.1 g. The total liquid was 95.5 g. (94.6+0.6 g.). VPC analysis of the liquid product showed an 8.5% conversion to $C_{12}$ olefin.

EXAMPLE 12

This example illustrates the isomerization and dimerization activity of the catalyst activated at the higher temperature.

A series of four runs were made with hexene-2, an internal olefin, using a double base treated CoO/C catalyst, i.e., an ammoniated carbon based catalyst which was retreated with ammonia after the cobalt salt was put on the carbon activated by heating to 450° C. for two hours. The four hexene-2 runs with this catalyst were made at 25° C., 85° C., 150° C., and 200° C., and each was run for 12 hours.

For the runs at 85°, 150°, and 200° C. the catalyst and hexene-2 were placed in a rocking bomb apparatus, the bombs were sealed and rocked for 12 hours. After cooling, the bombs were opened and the liquid contents separated from the wet catalyst. The liquid product was subjected to vapor phase chromatography analysis (VPC) to determine how much if any, of the product was hexene dimer or a $C_{12}$ olefin.

For the 25° C. run, the catalyst and hexene-2 were placed in a glass bottle and mounted on a shaker apparatus, and shaken for 12 hours. Recovery was 100% because the liquid was not separated from the wet catalyst. A sample of the liquid was extracted for VPC analysis as above.

The data on the runs were as follows:

| | A | B | C | D |
|---|---|---|---|---|
| Reaction Temp., ° C | 25 | 85 | 150 | 200 |
| Time hours | 12 | 12 | 12 | 12 |
| Wt. catalyst, g | 2.6 | 2.5 | 2.9 | 2.5 |
| Wt. hexene-2, g | 68 | 68 | 102 | 102 |
| Total Wt., g | 70.6 | 70.5 | 104.9 | 104.5 |
| Wt. liquid recov., g | | 63.1 | 96.2 | 94.2 |
| Wt. wet catalyst, g | | 3.3 | 3.6 | 3.9 |
| Total recovery, g | 70.6 | 66.4 | 99.8 | 98.1 |
| Total liquid | 68.0 | 63.9 | 96.9 | 95.6 |
| Percent $C_{12}$ in product | 0.2 | 3.9 | 6.3 | 7.0 |

The results show that the catalyst activated at the higher temperature causes isomerization of internal olefins to alpha-olefins which dimerize to $C_{12}$ olefins.

EXAMPLE 13

Following the procedure of Example 12, except that a catalyst prepared by activating the double ammoniated catalyst by heating it to 477° C., 68.1 g. (100 ml.) of hexene-2 was held in contact with the catalyst at 150° C. in a bomb at autogeneous pressure for 12 hours. Analysis of the liquid product by VPC showed 12.3% conversion to $C_{12}$ olefin.

When a catalyst activated at 530° C. was used hexene-2 dimerized in a bomb reactor under the same conditions as above to the extent that 13.3% of $C_{12}$ olefin was formed.

EXAMPLE 14

This example illustrates the effect of using ammonia gas as the carbon pretreating ammoniating agent in the production of ammoniated carbon cobalt oxide on carbon catalysts for use in dimerizing alpha-olefins.

A catalyst was prepared by passing ammonia gas at a flow rate of 90 ml. per minute (STP) over a batch of Pittsburgh Coke and Chemical Co. BPL activated carbon at 275° to 300° C. and at a reduced pressure of 35–50 mm. mercury vacuum pressure for 2–5 hours. After cooling (under nitrogen) the carbon was impregnated with cobalt nitrate and activated as described in Example 1.

Into several bomb autoclave reactors of 300 ml. capacity there was placed between 2–3 g. of the cobalt oxide on carbon catalyst, prepared as above, 10 ml. of heptane, and about 100 g. of propylene. The bombs were sealed and agitated for five hours at 85° C.

Additional propylene polymerization runs were made at 25° C. under similar conditions.

For another group of runs the ammonia treated carbon based cobalt nitrate impregnated catalyst obtained as above was given a post treatment with aqueous ammonium hydroxide, and then activated as described above, and propylene polymerization runs were made with this double ammoniated catalyst at 85° C. and 25° C. as above.

The conversions of propylene to low boiling liquid dimer were as follows for the respective catalysts.

| Catalyst | Temp of reaction (° C.) | Conversion, g. of liquid product/g. of catalyst | Percent |
|---|---|---|---|
| CoO/NH₃ treated carbon | 85 | [1] 20.5 | 51.3 |
| | 25 | [2] 21.7 | 51.1 |
| NH₄OH-CoO/NH₃ treated carbon | 85 | [1] 27.4 | 70.2 |
| | 25 | [2] 38.2 | 93.7 |

[1] Aver. of 6 runs.
[2] Aver. of 3 runs.

EXAMPLE 15

This example illustrates the preparation of an ammoniated carbon based cobalt oxide on carbon catalyst wherein liquid ammonia is used as the ammoniating agent.

To an excess of liquid ammonia there was added 50 g. of untreated Pittsburgh Coke and Chemical Company BPL activated carbon. The resulting mixture was allowed to stand with Dry Ice cooling for 1 hour. Then the excess ammonia was evaporated by letting the mixture stand at room temperature. Then the ammoniated carbon thus obtained was oven dried for one hour under vacuum.

To a solution of 11.65 g. of cobalt nitrate hexahydrate (equivalent to 3.0 g. of CoO) in 22 ml. of water there was added 20 g. of the above ammoniated carbon. The mixture was vacuum oven dried at 150° C. for 64 hours. After cooling the dried catalyst an excess of liquid ammonia was poured onto the catalyst. The liquid was allowed to evaporate at room temperature and then the resulting double ammoniated cobalt nitrate impregnated carbon catalyst was vacuum oven dried for 22.5 hours and activated at 275° C. (max. temp. was 280° C.), under nitrogen flowing at a rate of 68 ml./min., under 50 mm. vacuum for five hours.

This double liquid ammonia treated cobalt oxide on carbon catalyst was used to dimerize propylene in a rocking bomb autoclave reactor under conditions at 85° C. reaction temperature, for five hours. The results of three such runs were as follows:

| | G. of liquid product/ g. of catalyst | Conversion, percent |
|---|---|---|
| 1 | 13.9 | 45.3 |
| 2 | 10.2 | 37.3 |
| 3 | 14.1 | 47.5 |
| Average | 12.7 | 43.3 |

EXAMPLE 16

This example illustrates the use of ammonia under pressure as the post-treatment ammoniating agent, i.e., the ammoniation of a cobalt salt impregnated carbon using ammonia under pressure.

A 25.0 g. portion of an ammoniated cobalt nitrate impregnated carbon which had been prepared by impregnating 600 g. of activated carbon with 900 ml. of concentrated ammonium hydroxide, and air dried on a hot plate in a hood to a constant weight of 747 g., and adding this ammonium hydroxide treated carbon to 350 g. of cobalt nitrate hexahydrate in 500 ml. of water, and drying to a constant weight of 698.6 g., a 40 g. portion of which was activated by heating to 275° C. in nitrogen flowing at 87 ml./min., under 35 mm. vacuum for 2 hours, was placed in a 300 ml. bomb with 29 g. of ammonia. The bomb was sealed and heated at 150° C. for 10 hours. Then the bomb was cooled and vented and the catalyst was removed. The catalyst, 31.4 g. was dried in a hood for 5 hours (wt. 27.4 g.). A 5.2 g. portion was activated by heating in nitrogen (87 ml./min.) at 35 mm. vacuum pressure for 2 hours.

A 2.3 g. portion of this double ammoniated CoO/C catalyst was used to polymerize 148.0 g. of propylene in a bomb reactor at 30° C. for 5 hours. Another 2.0 g. portion was used to polymerize 124.0 g. of propylene in a similar bomb at 85° C. for 5 hours. The conversion in terms of grams of liquid product per gram of catalyst were 57.7 g. and 40.4 g., respectively of liquid product per gram of catalyst.

EXAMPLE 17

This example illustrates the substantial straight chain nature of higher carbon content olefin products obtained by dimerizing lower boiling liquid alpha-olefins with the catalysts prepared as described in the above examples.

Two batches of hexene-1 (150 ml. each) were placed in rocker bomb reactors with 2.5 g. of a double ammonium hydroxide treated CoO/C catalyst the first catalyst (A) being activated at 275° C. in nitrogen flowing at a rate of 87 ml./min. under vacuum of 35 mm. for 2 hours, and the second catalyst (B) at 450° C. under the same conditions of time, nitrogen flow, and pressure.

The catalyst and hexene-1 mixture in each bomb was sealed and heated to 150° C. for 12 hours, and then cooled, vented and the contents emptied. The conversion rates to $C_{12}$ olefin was as follows:

| Catalyst: | Conversion, percent of total liquid |
|---|---|
| (A) | 18.6 |
| (B) | 8.5 |

The $C_{12}$ fraction of the liquid product was hydrogenated to convert the olefins to the respective alkanes and analyzed for isomer content. The results below show the essentially straight chain nature of the product.

| | (A) 1-Hexene Dimer | (B) 1-Hexene Dimer |
|---|---|---|
| Temp. of catalyst activation, °C | 275 | 450 |
| Isomer, percent of total $C_{12}$: | | |
| n-Dodecane | 82.8 | 55.5 |
| 5-methylundecane | 14.8 | 34.8 |
| 4-ethyldecane | 2.4 | 9.7 |
| 5,6-dimethyldecane | (¹) | (¹) |

¹ Not observed.

EXAMPLE 18

This example illustrates the preparation of a detergent length alkylatable olefin in two polymerization steps from a gaseous alpha-olefin using the catalyst of this invention in each polymerization step.

Propylene was dimerized as described in Example 3 in a continuous flow reactor system using a catalyst prepared as described in Example 1 wherein an activated carbon was first treated with ammonium hydroxide, dried, impregnated with cobalt nitrate, dried, re-treated with ammonium hydroxide, dried again, and then activated in nitrogen at 275° C. The propylene dimer product thus obtained was fractionally distilled to separate the normal from the bulk of the branched dimer fractions.

The normal hexene (propylene dimer) fraction thus obtained analyzed as containing 0.71% trans-4-methylpentene-2, 2.81% hexene-1, 3.24% 2-methylpentene-1, 3.36% trans-hexene-3, 0.82% cis-hexene-3, 55.15% trans-hexene-2, 1.01% 2-methylpentene-2, and 32.89% cis-hexene-2.

Into a 1 inch internal diameter stainless steel reactor there was placed 56.2 g. of a catalyst which contained 13.5% of cobalt oxide on carbon, by weight. The catalyst was a double ammoniated catalyst, prepared as described in Example 1. The catalyst was activated in this reactor by passing nitrogen over it for three hours at 475° C. After cooling the reactor and contents to 150° C., propylene dimer liquid fraction, described above, was pressured into the reactor until an operating pressure of 300 p.s.i.g. was reached. Then while maintaining this pressure the propylene dimer feed was metered through the reactor at a flow rate of 0.67 ml. per minute at 150° C. until a total of 3926 g. of propylene dimer fraction had passed over the catalyst. There was obtained as product 251 g. of dodecenes, consisting essentially of a mixture of n-dodecene, methylundecene, and ethyldecene. The productivity of the run was 4.463 g. of dodecene product per gram of catalyst.

The above data becomes more significant when one compares the nature of the $C_{12}$ product obtained by the dimerization of n-hexenes using a conventional silica-alumina catalyst. In those products, after, hydrogenation, there was no n-dodecane and less than 5% of 5-methylundecane and 4-ethyldecane structures.

We claim:

1. A method for preparing substantially linear liquid olefins which comprises polymerizing an olefin having from 2 to 10 carbon atoms at a temperature of from −10° C. to about 250° C. using a catalyst which has been prepared prior to polymerizing said olefins by ammoniating an activated carbon with aqueous ammonium hydroxide, drying the thus treated activated carbon, impregnating the thus treated carbon with an oxygen containing cobalt salt of an acid capable of being decomposed to cobalt oxide when subjected to heating at temperatures not over 300° C., said cobalt salt being selected from the group consisting of cobalt nitrate, cobalt sulfate, and cobalt salts of alkanoic acids of 1 to 6 carbon atoms, drying the cobalt salt-impregnated ammoniated carbon thus obtained, and heating the cobalt salt impregnated activated carbon to temperatures from 200° C. to 550° C. in an inert atmosphere.

2. A method as described in claim 1 wherein the dried cobalt salt-impregnated activated carbon is ammoniated prior to heating the impregnated activated carbon to 200° C. to 550° C. in the presence of an inert atmosphere.

3. A method as described in claim 1 wherein the aqueous solution of an oxygen containing cobalt salt of an acid is an aqueous solution of cobalt nitrate.

4. A method as described in claim 1 wherein the olefin being polymerized is an alpha-olefin.

5. A method as described in claim 4 wherein the alpha-olefin is ethylene.

6. A method as described in claim 4 wherein the alpha-olefin is polymerized at a temperature of from 10° to 150° C.

7. A method as described in claim 6 wherein the alpha-olefin is ethylene.

8. A method as described in claim 6 wherein the alpha-olefin is propylene.

9. A method as described in claim 8 wherein the cobalt salt impregnated activated carbon is heated to from 200° C. to 300° C.

10. A method for preparing substantially linear liquid olefins which comprises polymerizing propylene at a temperature of from −10° to 200° C. using a catalyst prepared by ammoniating an activated carbon with aqueous ammonium hydroxide, drying the thus treated activated carbon, impregnating the thus treated activated carbon with an aqueous solution of cabolt nitrate, drying the cobalt nitrate impregnated activated carbon and heating the cobalt nitrate impregnated ammoniated activated carbon thus obtained to from about 200° C. to 300° C.

11. A method as described in claim 10 wherein the cobalt nitrate impregnated activated carbon is ammoniated prior to heating the impregnated activated carbon to 200° to 300° C.

References Cited by the Examiner
UNITED STATES PATENTS

| | | | |
|---|---|---|---|
| 2,318,719 | 5/1943 | Schneider et al. | 260—683.15 |
| 2,599,249 | 6/1952 | Friedman | 260—683.15 |
| 2,692,261 | 10/1954 | Peters et al. | 260—683.15 |
| 2,692,295 | 10/1954 | Peters | 260—683.15 |
| 2,939,803 | 6/1960 | Steele | 252—447 X |
| 2,983,691 | 5/1961 | Richardson | 252—453 |
| 3,137,739 | 6/1964 | Paulis et al. | 260—683.15 |

DELBERT E. GANTZ, *Primary Examiner.*

R. H. SHUBERT, *Assistant Examiner.*